INVENTOR.
S. Ulmer
BY Robert Harding Jr.
ATTORNEY

INVENTOR.
S. Ulmer
BY
Robert Harding Jr.
ATTORNEY

INVENTOR.
S. Ulmer
BY
Robert Harding Jr.
ATTORNEY

Oct. 15, 1963 S. ULMER 3,107,341

CIRCUIT ARRANGEMENT FOR MARKING THE POINTS OF INTERSECTION OF A RESISTANCE-DIODE MATRIX

Filed April 28, 1958 5 Sheets-Sheet 4

INVENTOR.
S. Ulmer
BY Robert Harding Jr.
ATTORNEY

INVENTOR.
S. Ulmer
BY Robert Harding Jr.
ATTORNEY

United States Patent Office 3,107,341
Patented Oct. 15, 1963

3,107,341

CIRCUIT ARRANGEMENT FOR MARKING THE POINTS OF INTERSECTION OF A RESISTANCE-DIODE MATRIX

Sieghard Ulmer, Stuttgart-Zuffenhausen, Germany, assignor to International Standard Electric Corporation, New York, N.Y., a corporation of Delaware Filed Apr. 28, 1958, Ser. No. 731,425
Claims priority, application Germany Apr. 27, 1957
9 Claims. (Cl. 340—166)

Figure 1:
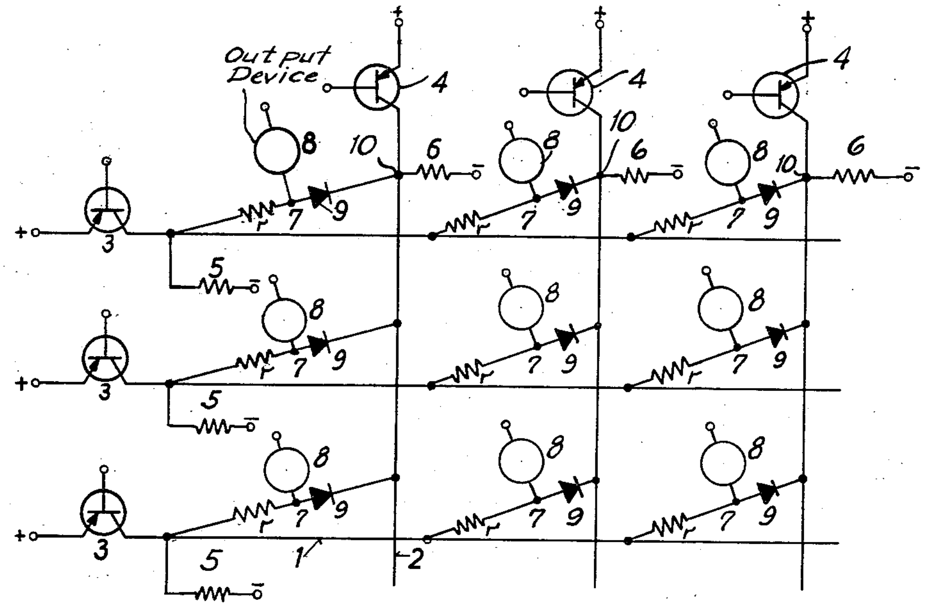

This invention relates to a circuit arrangement for effecting the selection of the points of intersection of a resistance-diode matrix.

In electronic computing and data-processing techniques coincidence arrangements are often used to select one or another functional process. Such coincidence arrangements are known to be designed as matrices, the intersecting points of which are selected whenever the corresponding vertical and horizontal lines are pulsed. In many cases it may also be necessary, for several horizontal lines have to be pulsed simultaneously. An example is the selection of traces on magnetic drum storage devices, where several traces are to be recorded simultaneously.

The selection of the lines and columns may be effected with the aid of transistor switches. In the case of the enabled (connected through) line transistors a small current will flow across the diode (serially connected at the points of intersection between the row and column wires) and the collector resistance of the column transistor. Thus a small voltage drop will appear across the resistance. If, however, many row transistors are enabled at the same time then a relatively high current will flow across the collector resistance of the column transistor and will cause such a high voltage drop, that the points of intersection may be easily marked without the column transistor being enabled.

To exclude this source of error is one object of the present invention. It is based on the recognition that the high line current must be drawn off in the nonpulsed condition. This invention, therefore, relates to a circuit arrangement for selecting the points of intersection of a resistance-diode matrix, in which several rows or columns are controlled simultaneously via electronic switches. According to the invention there is provided, in addition to the operating resistance of the switch which upon closure causes the complete selecting for the associated points of the matrix (which are already semi-marked by the switches affecting the rows of the matrix) a shunt across the said resistance. The shunt is activated in the rhythm of the input pulses, arriving at the associated switch, by means of electronic switches so as to become effective in the semi-marked condition, and ineffective in the selected condition.

With the aid of this arrangement it is possible to keep the high currents in the semi-marked condition away from the operating resistance so that the potential at the collector of the respective transistor, when suitably dimensioning the shunt, will not exceed a predetermined value and thus any unwanted selection. If so required two or more shunt gaps or sections may also be provided. Transistors are particularly suitable for shunt switches since they are easily adaptable to row and column transistor switches and they may be actuated in a correct manner with respect to time and phase.

In order to obtain potential conditions of the transistors which are adapted to each other it is appropriate to control the base electrode of the shunt transistor via a further transistor. This further transistor is always enabled when the coincidence (or column) transistor is connected through or enabled. A single potential applied to the base electrodes of these two transistors (coincidence and further) may be adjusted with the aid of suitable resistors arranged in the base electrode line.

In some cases it may also be appropriate to control these base electrode lines via separate transistors from the input, i.e., whenever the currents on the control leads differ greatly from each other.

Figure 2:
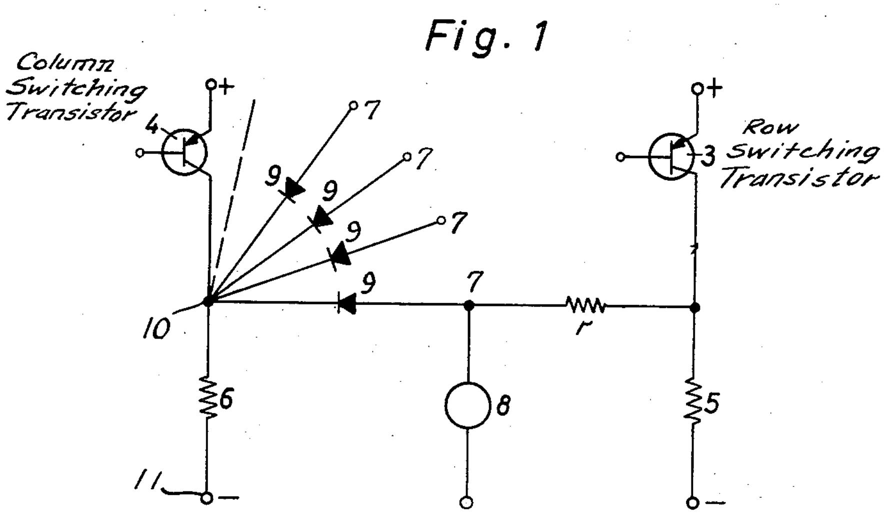
Figures 3, 4:
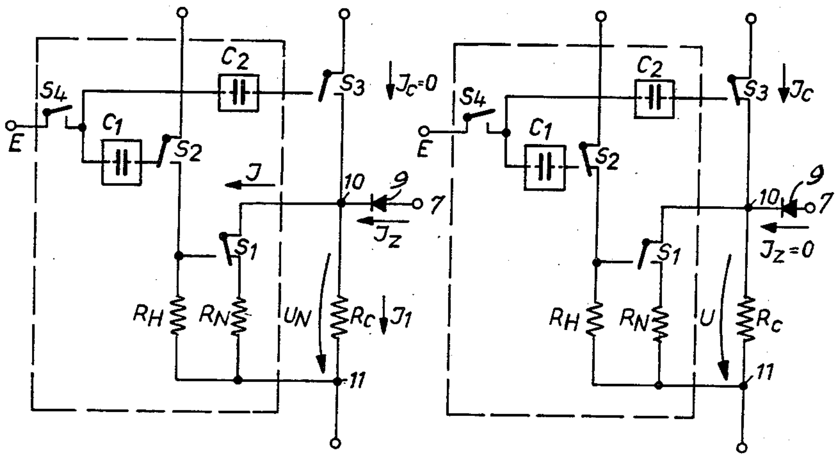
Figure 5:
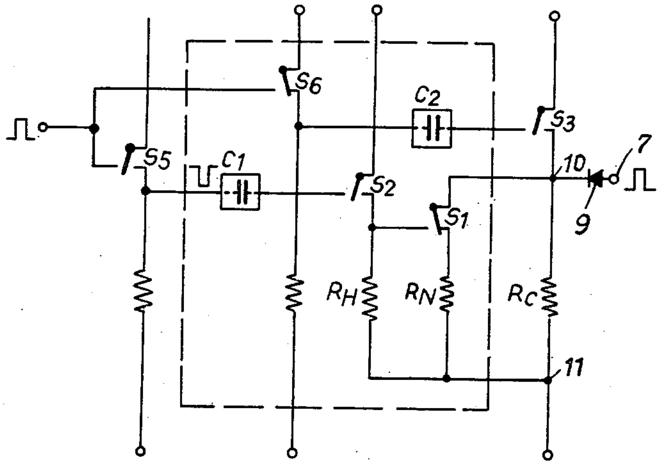
Figure 6:
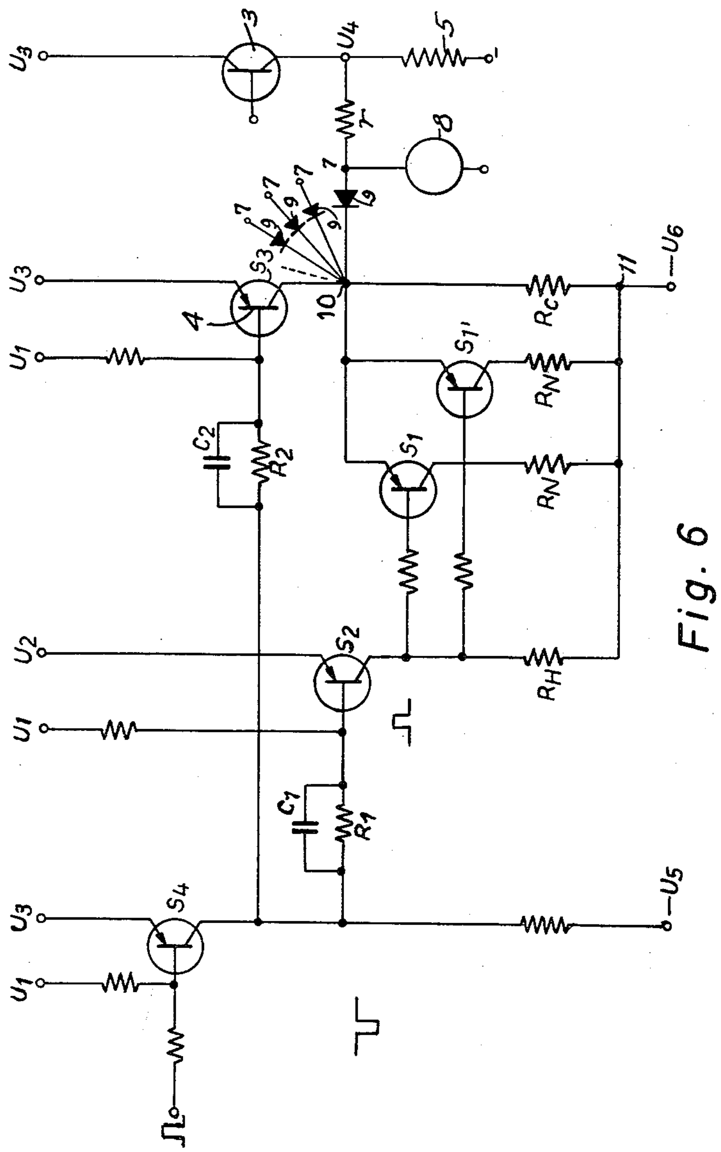
Figure 7:
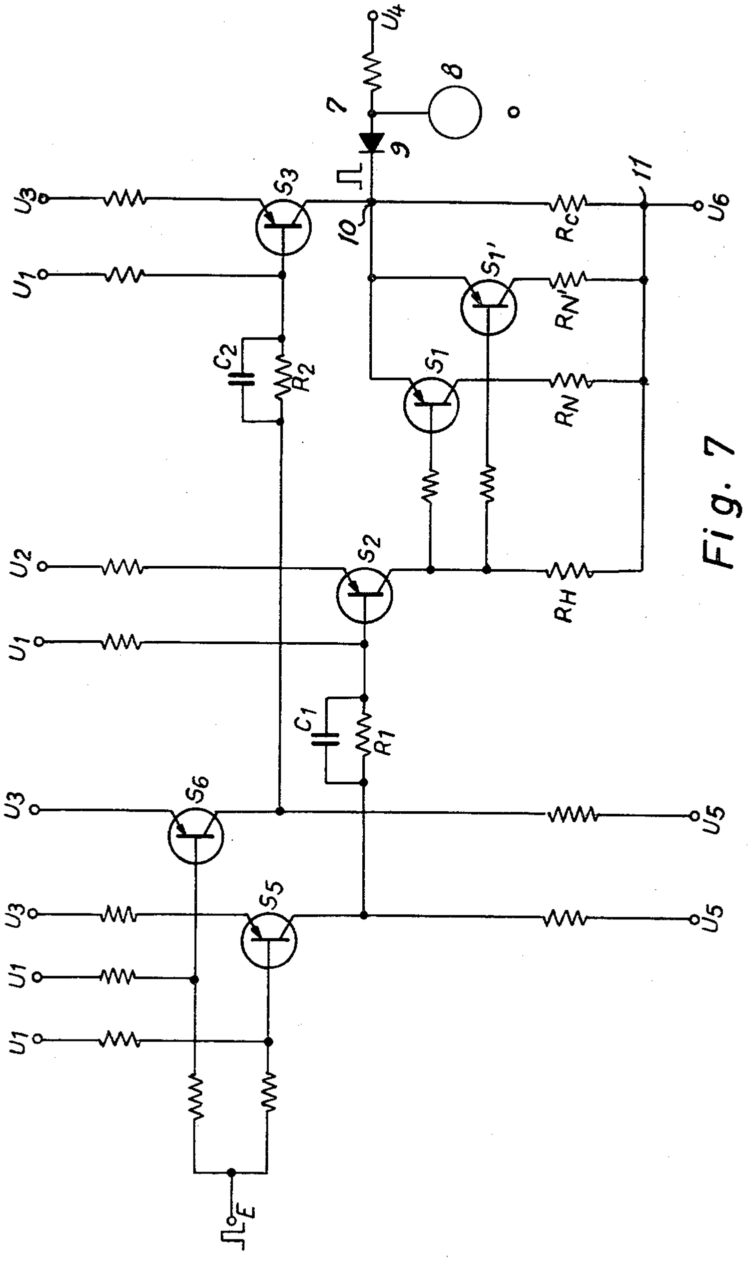
Figure 8:
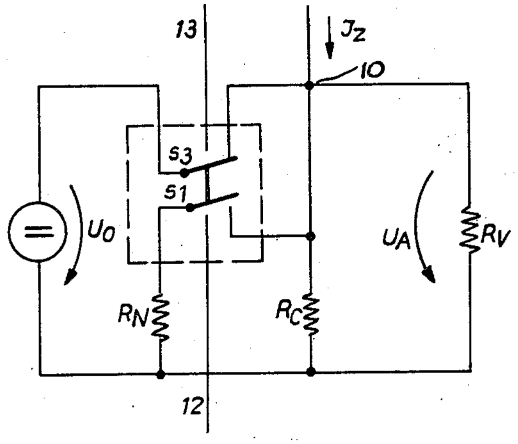
Figure 9:
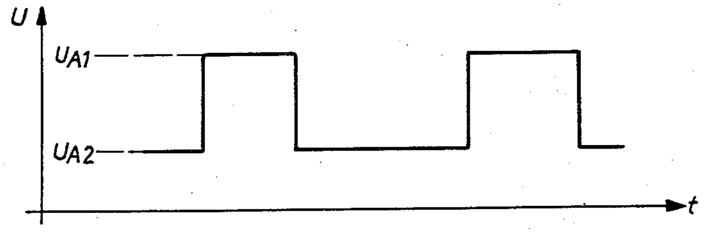
Figure 10:
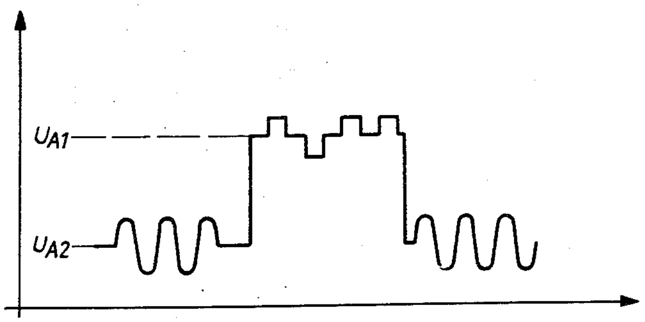

In the following the invention will be described by way of example in particular with reference to transistor switches:

FIG. 1 shows a resistance-diode coincidence matrix,

FIG. 2 shows one single column of the matrix comprising the corresponding elements for setting up the coincidence at one matrix intersection, FIGS. 3 and 4 by using the symbols of the switching technique, schematically show the arrangement according to the invention with respect to both circuit conditions existing at one point of the matrix, FIG. 5 shows a further embodiment of the arrangement according to FIGS. 3 and 4, FIG. 6 shows an arrangement for realizing the circuit arrangement according to FIG. 5 with transistors, FIG. 7 shows a further embodiment of the arrangement according to FIG. 6, FIG. 8 shows an arrangement for being used as a switchover device for two supply voltages of one load, FIG. 9 shows a diagram of the voltages applied to the load at a successive actuation of the switches $S_1$ and $S_3$, FIG. 10 shows a diagram of the voltage applied to the load and produced by a variation of the switch resistances.

Referring to FIG. 1 there is shown a conventional type of resistance-diode matrix comprising the horizontal (row) 1 and the vertical (column) 2 switch wires. The individual points of intersection of the matrix may be controlled via the corresponding row transistors 3 and column transistors 4. If both transistors are enabled, i.e., if both transistors are rendered conductive, then a coincidence will exist at the corresponding cross-point of the matrix. The collector resistances 5 and 6 for the collector electrodes of the respective transistor switches 3 and 4 are both applied to the same fixed potential, for example, a fixed negative potential. Load 8, an output device such as a pulse generator, is connected to the cross-point 7. Each device 8 is activated only when a coincidence exists at the corresponding cross-point 7, the device being excited by current from the row transistor 3 which is prevented from passing through the corresponding cross-point diode 9 by the voltage developed across the column load resistor 6 via the column switching transistor 4.

FIG. 2 schematically illustrates the circuit connections comprising a single column of the matrix array of FIG. 1. For the sake of simplicity only one row switching transistor 3, one column switching transistor 4, and one column load resistor 6, are shown. Also, only one cross-point output device 8 is shown connected to a corresponding cross-point diode 9. It should be understood, however, that the other diodes 9 in FIG. 2 are associated with corresponding other cross-points of the same matrix column, and that therefore each diode 9 may be assumed to be connected to a separate row switching transistor 3, and cross-point output device 8. If several row transistors 3 are enabled, which is necessary in some applications, then via their respective diodes 9, a number of currents would be fed to the resistance 6 effecting a correspondingly higher voltage drop. This voltage drop may assume such proportions that the potential on the resistor 6 would be the same as it would be had transistor 4 been purposely enabled. Accordingly, a coincidence would be established erroneously at point 7 causing a faulty operation of the pulse generator. Practically, therefore, a selection via the column transistors would no longer be possible, because these considerations apply to all columns.

This undesirable condition cannot be remedied by making the resistor 6 as small as possible since a certain voltage drop is required for the marked condition, and the collector current must be prevented from exceeding a definite value. Accordingly, the resistance 6 must possess contradictory values, namely, a high and low resistance. This dilemma is met by the arrangements according to the invention which are shown in block form in FIG. 1, and schematically in FIGS. 3, 4 and 5.

FIGS. 3, 4 and 5 show the shunt (dashed box) cooperating with the elements transistor 4 and resistor 6 ($S_3$ and $R_c$ respectively). FIGS. 3 and 4 show the operation of the shunt with the transistor 4 ($S_3$) disabled and enabled, respectively. FIG. 5 illustrates an alternate embodiment of the shunt.

Turning now to FIG. 3 (switch $S_3$, corresponding to transistor 4, open) a current $I_z$ (due to row wires and passing through diodes of FIGS. 1 and 2) is applied via the point 10. In the absence of shunt (dashed box) $I_z$ would cause a voltage drop across $R_c$ equal to $I_z \cdot R_c$. This drop as mentioned before is too large, and to this end there is provided the shunt circuit consisting of the switch $S_1$ and the resistor $R_N$, which is always effective when the switch $S_3$ is opened. In other words $S_1$ must be closed whenever $S_3$ is opened, and must be open whenever $S_3$ is closed. The controlling of the switches $S_1$ and $S_3$ is effected from the common input E through switches $S_2$ and $S_4$. The function of the switch $S_2$, which is necessary when transistors are employed, as well as the function of the coupling elements $C_1$ and $C_2$ will be described hereinafter.

According to FIG. 3 with switch $S_1$ closed the parallel combination of $R_N$ and $R_c$ is present to receive current $I_z$. Now with $R_N \ll R_c$ the voltage drop between 10 and 11 is $I_1 \cdot R_c$, and with the above relationship of $R_N$ to $R_c$ it is obvious that most of the current ($I = I_z - I_1$) is drawn off across the shunt circuit ($S_1$ and $R_N$) and the voltage drop is much smaller.

In the second circuit condition (FIG. 4) the switch $S_3$ will be closed and switch $S_1$ open, accordingly, $I_z$ will become zero. The switch $S_1$ is now open so that the current $I_c$ is permitted to completely flow across the high-ohmic resistance $R_c$ thus causing the voltage drop $U_c = I_c \cdot R_c \gg U_N$.

If the currents on the control lines differ very much from each other then it may be appropriate to actuate the switch $S_3$ via a preliminary stage $S_5$ of its own as shown in FIG. 5.

In FIG. 6 the circuit arrangement according to FIGS. 3 and 4 is shown embodying transistor switches. In this case it is additionally assumed that the current $I_z$ is so great that two switches $S_1$ have to be connected in parallel. Accordingly, the shunt circuit consists of the two parallel branches $S_1$, $R_N$ and $S'_1$, $R'_N$. The actuations of the switches $S_2$ and $S_3$ are controlled via their base electrodes from the common input transistor $S_4$.

The single switch $S_1$ (FIG. 5) and the dual switches $S_1$ (FIG. 6) are controlled indirectly via the transistor $S_2$ since it is necessary for the transistor $S_1$ to be reliably disabled (non-conductive) whenever the transistor $S_3$ is enabled or passing current. If the transistor $S_2$ has a higher emitter voltage than the transistor $S_3$, a more positive voltage will be reliably applied to the base electrode of the transistors $S_1$ when both transistor switches $S_2$ and $S_3$ are enabled than to the emitter electrodes thereof. In this way the transistors $S_1$ are sure to be disabled whenever $S_3$ is enabled.

The coupling elements $C_1$, $R_1$ and $C_2$, $R_2$ serve to actuate the two transistors $S_2$ and $S_3$ at the correct time position. It is necessary that $S_1$ be opened prior to the closing of $S_3$, and vice versa.

The arrangement of FIG. 7 differs from the arrangement of FIG. 6 in that two separate transistors $S_5$ and $S_6$ are used for the controlling of the two transistors $S_2$ and $S_3$. This is appropriate whenever the currents of the control lines differ greatly from each other. The two transistors $S_5$ and $S_6$ are controlled via the common input E. In this embodiment care will have to be taken with respect to the proper phase position of the input pulse at E, in order to obtain the proper potentials at the actual switching transistors.

The circuit arrangements as shown in FIGS. 3—4 may also be used as a switchover device for producing two discrete voltages across an auxiliary load. Such a device is shown schematically in FIG. 8. The circuit arrangement of FIG. 8 only differs from that shown in FIG. 4 in that a load $R_v$ is in parallel with the resistor $R_c$. Moreover, the described current and voltage conditions may also apply to those positions of the two switches $S_1$ and $S_3$ which are connected via the control lines 12 and 13. Accordingly, it will be seen that the load $R_v$ may be randomly applied to two voltages $U_{A1}$ and $U_{A2}$ the magnitude of the two voltages depending on the dimensioning of the related circuit elements, so that both voltages may be selected at will.

Since the switches $S_1$ and $S_3$ are capable of being controlled from the outside, and since they are never opened or closed at the same time, the voltage applied to the load $R_v$, may be varied with respect to time in accordance with any desired rhythm.

In FIG. 9 the voltage as applied to the load $R_v$ when both switches are actuated in a predetermined rhythm with respect to time is shown. The voltage $U_{A1}$ exists when the switch $S_3$ is closed, while the voltage $U_{A2}$ is applied to the load $R_v$ whenever the switch $S_1$ is closed.

A further possibility of varying the voltage applied to the load $R_v$, with respect to time, consists in varying the resistance of the switch with respect to time. With respect to transistorized switches this variation may be accomplished in a simple manner by varying the base potential with respect to time. In the case of a sinusoidal variation of the potential at the base electrode of the transistor $S_1$ and a pulse-shaped variation of the potential at the base electrode of transistor $S_3$ the voltage conditions as shown in FIG. 10 will be obtained at the load $R_v$.

A further variation of the voltage $U_A$ may be accomplished by a variation of the current $I_z$ and/or of the voltage $U_o$, so that practically any desired shape of voltage may be produced at the load $R_v$.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A matrix comprising coordinate sets of lines, first switch means connected to each of said lines for applying a marking voltage to that line, a diode and resistor serially connected between each line of one set and each line of the other set at their intersection, a source of voltage different from said marking voltage, a separate voltage developing impedance, with at least two terminals, associated with each line of one of said sets of line, one of said terminals connected to the associated line and the other of said terminals connected to said source of different voltage, to thereby complete a series circuit including said impedance, said associated line and said source of different voltage, a separate activatable shunt connected in parallel with each said voltage developing impedance, and second switch means for jointly activating each activatable shunt while disabling the corresponding first switch means, whereby the voltage developed across said voltage developing impedance may be reduced.

2. A matrix according to claim 1 in which each said voltage developing impedance comprises a first resistor, and each corresponding activatable shunt comprises a series combination, of a second resistor and a switch, connected in shunt with said first resistor.

3. A matrix comprising horizontal and vertical sets of lines, a separate line transistor switch connected to each of said lines for applying a marking voltage to that line, a diode and a resistor serially connected between each horizontal and vertical line at their intersection, a separate voltage developing resistor connected to each line of one of said sets of lines as a load resistor in series with the corresponding transistor switch, a separate activatable shunt connected in parallel with each of said voltage developing resistors, each of said shunts comprising the series combination of a transistor switch and a resistor, and transistor switch means coupled to each said shunt and to the associated line transistor for jointly controlling said shunt and said associated line transistor whereby said voltage developing resistor is shunted by the series resistor in said shunt when the associated line transistor is inactive, and whereby said series resistor in said shunt is disconnected when said associated line transistor is activated.

4. A matrix as claimed in claim 3 in which the switch means for controlling the shunt transistor comprises a further transistor the collecter electrode of which is coupled to the shunt resistor and the voltage developing resistor, said further transistor having a more positive emitter voltage than the associated line transistor.

5. A matrix as claimed in claim 3 further comprising at least one additional shunt circuit comprising a shunt transistor and a shunt resistor and connected in parallel to the activatable shunt.

6. A matrix as claimed in claim 4, further comprising a common input control transistor coupled to the further transistor and the associated line transistor whereby said control transistor may control the shunt transistor through the further transistor, and the line transistor.

7. A matrix as claimed in claim 6 in which the common input control transistor is connected to the further transistor and the line transistor through separate resistance capacitance timing networks.

8. A matrix as claimed in claim 1, in combination with an output device connected to the junction of each said serially connected diode and resistor whereby the whole apparatus serves as a switch-over matrix for selectively altering the voltage applied to said output device.

9. In a switching matrix, the combination of a plurality of signal sources, a plurality of output devices individually coupled to said sources, a plurality of unidirectionally conductive elements individually coupled to said signal sources and to said corresponding output devices, a variable impedance connected in common to all of said unidirectionally conductive elements for completing, with said elements, a plurality of shunt circuit paths in parallel with said corresponding output devices, means for selectively applying signals to said variable impedance and means coupled to said signal applying means and to said variable impedance for jointly controlling the output of said applying means and the impedance of said variable impedance.

References Cited in the file of this patent

UNITED STATES PATENTS

| | | |
|---|---|---|
| 2,590,950 | Eckert et al. | Apr. 1, 1952 |
| 2,627,039 | MacWilliams | Jan. 27, 1953 |
| 2,782,307 | Von Sivers | Feb. 19, 1957 |
| 2,960,681 | Bonn | Nov. 15, 1960 |
| 2,985,771 | Halpern | May 23, 1961 |
| 2,992,410 | Groth et al. | July 11, 1961 |
| 2,995,664 | Deuitch | Aug. 8, 1961 |

OTHER REFERENCES

Hunter, L. P.: Handbook of Semiconductor Electronics, McGraw-Hill Book Company, New York, 1956.